United States Patent

[11] 3,589,767

| [72] | Inventor | Gerald W. Stuart |
| | | Pontiac, Mich. |
| [21] | Appl. No. | 795,978 |
| [22] | Filed | Feb. 3, 1969 |
| [45] | Patented | June 29, 1971 |
| [73] | Assignee | Traffic Transport Engineering, Inc. |
| | | Dearborn, Mich. |

[54] VEHICLE TRANSPORT
18 Claims, 16 Drawing Figs.

| [52] | U.S. Cl. | 296/1 |
| [51] | Int. Cl. | B60p 3/08 |
| [50] | Field of Search | 296/1 A; 105/368 |

[56] References Cited
UNITED STATES PATENTS

| 1,643,885 | 9/1927 | Gill | 296/1 |
| 2,096,455 | 10/1937 | Francis | 296/1 |
| 2,993,725 | 7/1961 | Van Keuren | 296/1 |
| 3,084,970 | 4/1963 | Day | 296/1 |
| 3,104,127 | 9/1963 | Swartzwelder | 296/1 |
| 3,163,459 | 12/1964 | Gyori et al. | 296/1 |
| 3,343,865 | 9/1967 | Stuart | 296/1 |

*Primary Examiner*—Benjamin Hersh
*Assistant Examiner*—Leslie J. Paperner
*Attorney*—Barnes, Kisselle, Raisch & Choate

ABSTRACT: A vehicle transport adapted for transporting a load of seven full-size passenger cars, a mixed load of seven trucks and passenger cars or a load of a lesser number of trucks. The vehicle transport includes a tractor adapted to carry two vehicles, one above and one behind the cab, and a trailer adapted to carry five passenger cars or a lesser number of trucks. This load arrangement is made possible by a particular track arrangement and a fifth wheel assembly mounted at the rear end of the tractor with the horizontal pivot axis of the fifth wheel assembly below the centerline of the rear axle of the tractor.

PATENTED JUN 29 1971

INVENTOR.
GERALD W. STUART
BY
Barnes, Kisselle, Raisch & Choate
ATTORNEYS

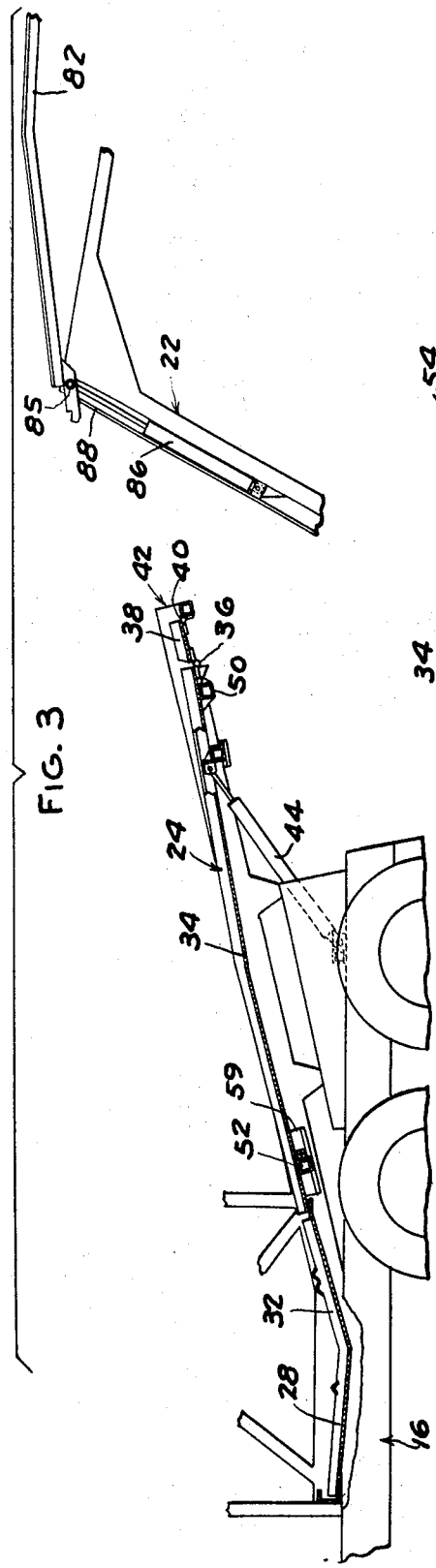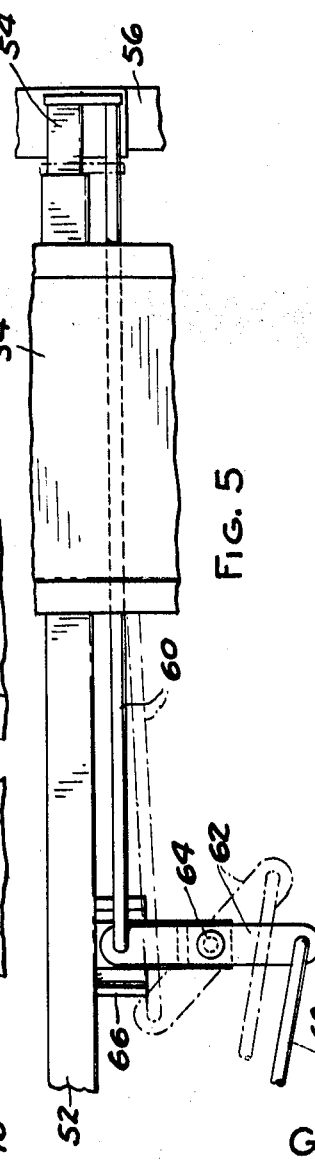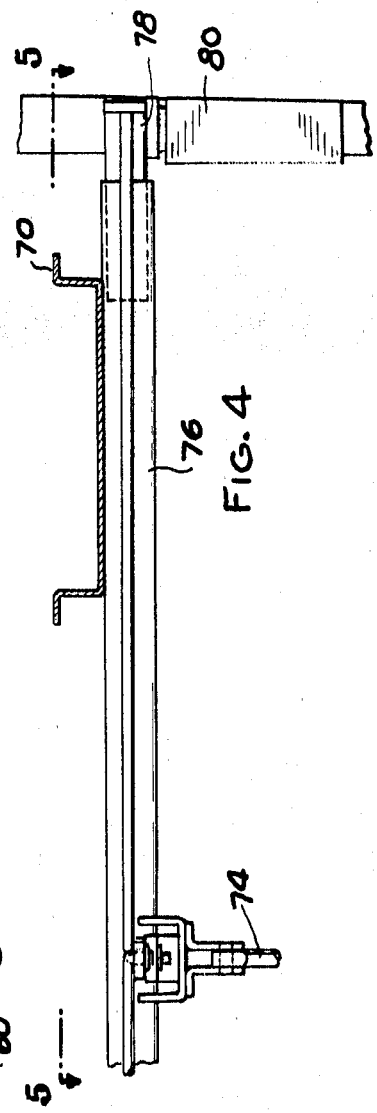

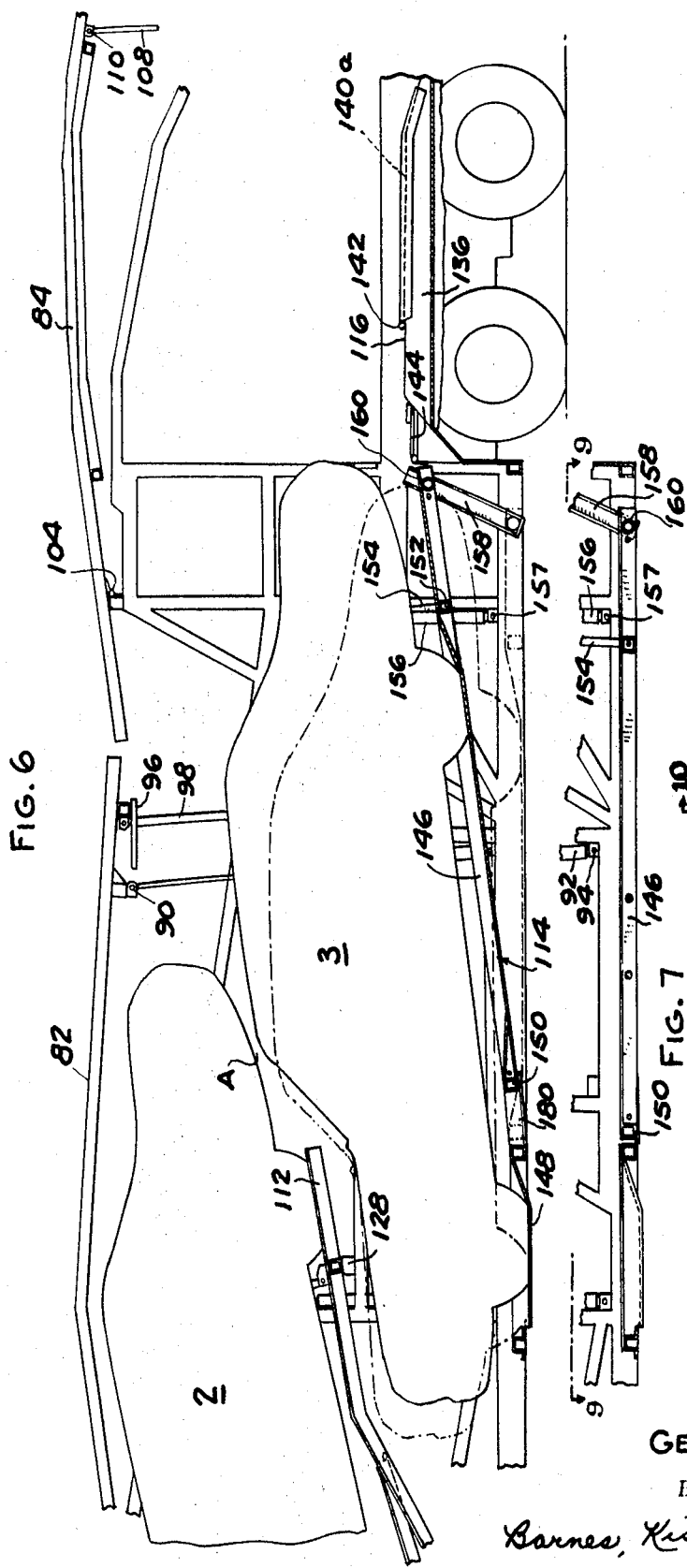

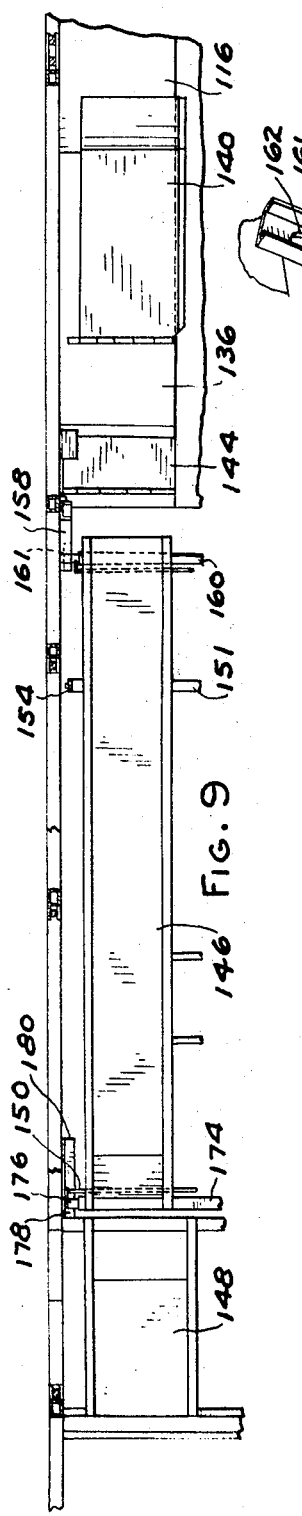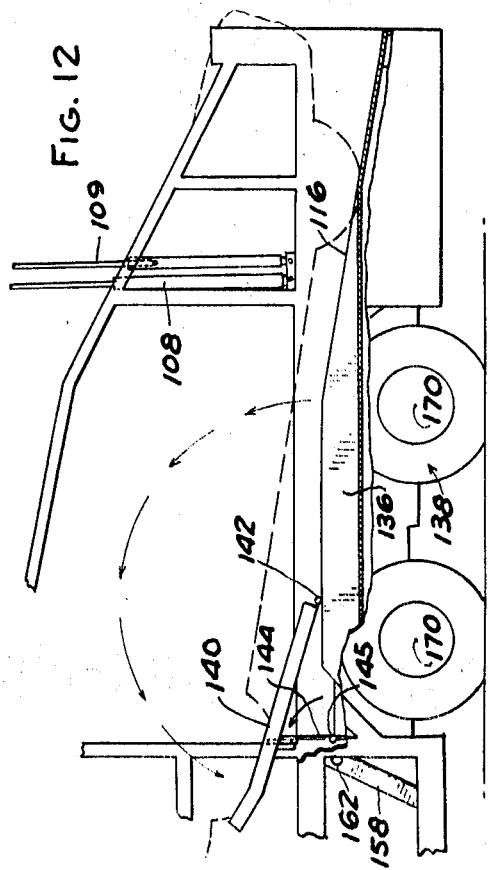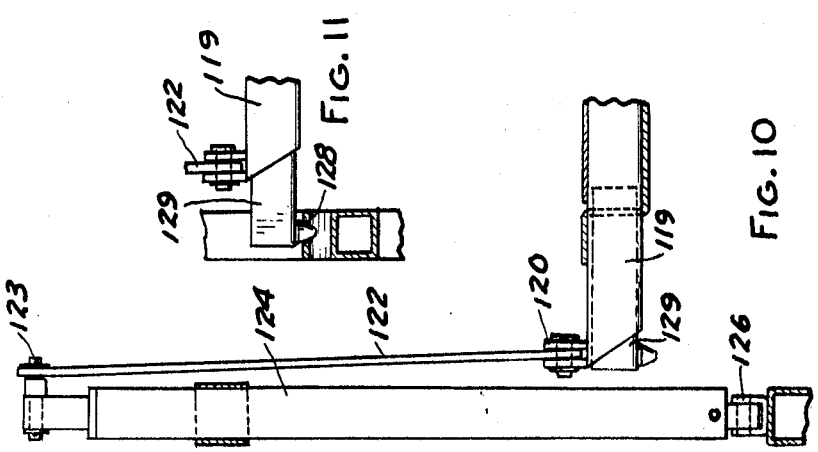

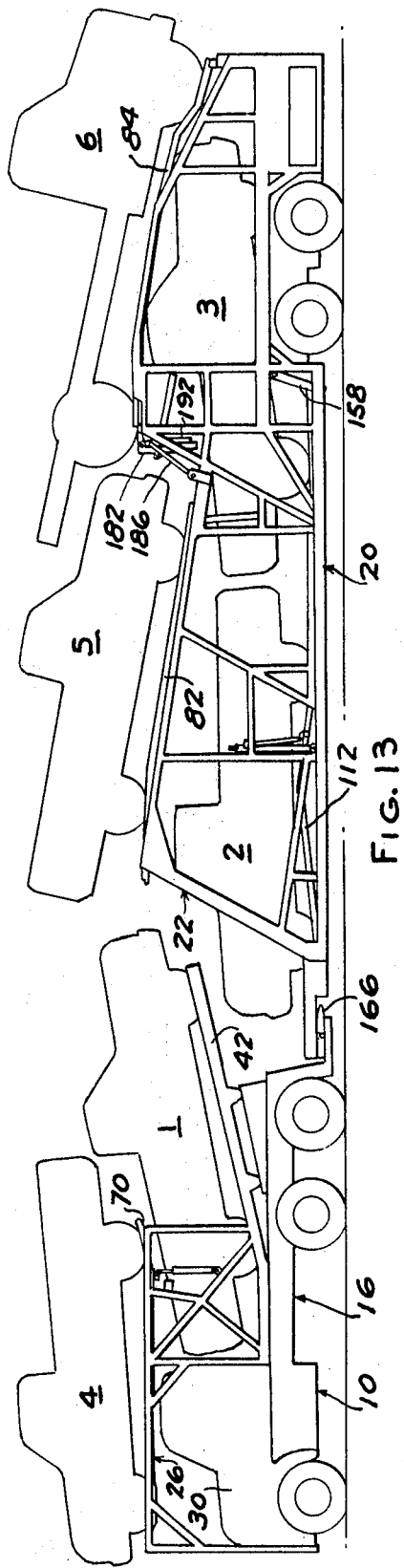
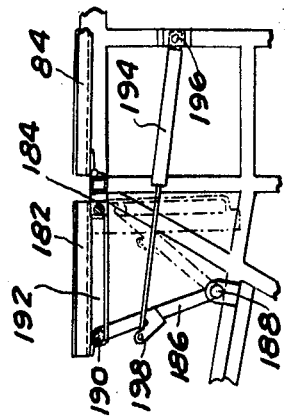
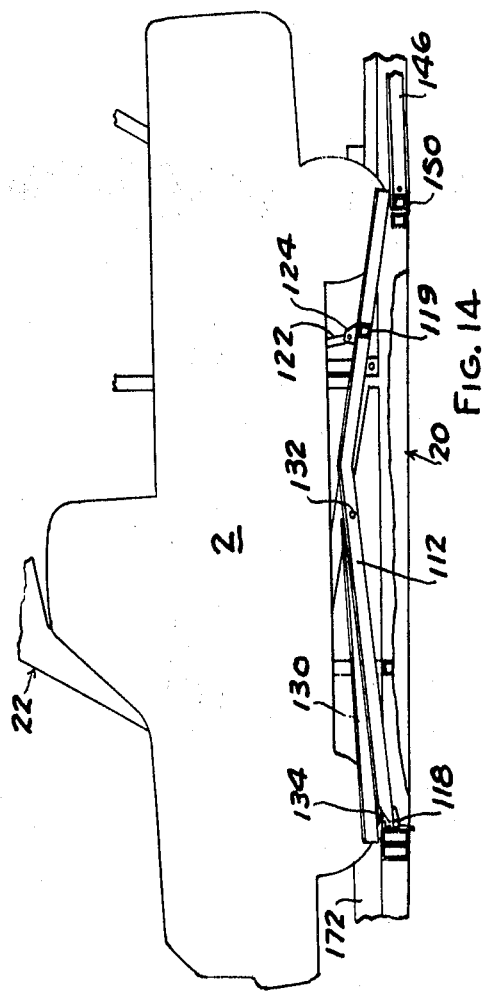

VEHICLE TRANSPORT

This invention relates to vehicle transports and more particularly to a highway tractor-trailer unit designed for hauling seven full-size passenger cars.

Many states have enacted laws which prescribe the maximum length and height limitations for motorcar carriers. Generally speaking, a loaded vehicle transport must not exceed 60 feet in length and 13½ feet in height. In addition, state laws prescribe the maximum load that can be carried on any axle. These restrictions require very careful design considerations in connection with tractor-trailer combinations used for transporting motor vehicles.

In my prior U.S. Pat. No. 3,343,865, dated Sept. 26, 1967, there is illustrated a vehicle transport adapted for carrying seven full-size passenger cars, two on the tractor and five on the trailer. While the vehicle transport disclosed in my said prior patent is admirably suited for transporting seven full-size passenger cars, it is not well suited for carrying an equal number of passenger cars and trucks as a mixed load. Furthermore, experience has shown that with the arrangement disclosed in my prior patent the ability of the vehicle when loaded to negotiate sharp turns is limited.

When it was attempted to load the tractor-trailer combination disclosed in my prior patent with trucks and passenger cars two problems were encountered. If a truck (such as a pickup truck) were loaded on the lower track of the tractor insufficient clearance would result between the rearwardly facing end of the pickup and the vehicle on the lower front track of the trailer. In addition, with a heavier load on the trailer the maximum permissible loads on the rear axles of the tractor and on the axle of the trailer were exceeded. In order to overcome these problems significant changes in the design of the tractor-trailer combination had to be adopted. The single rear axle on the trailer was moved forwardly and converted to a tandem axle. The trailer itself was lengthened, the tractor shortened, the fifth wheel assembly was mounted at a lower level and the lower track on the tractor was rearranged to support a vehicle thereon at a much steeper angle.

While the overall length of the tractor-trailer combination disclosed in my prior patent was approximately 60 feet, the trailer itself had a length of approximately 37 feet. As shown in U.S. Pat. No. 3,343,865, the horizontal pivot axis of the fifth wheel assembly was located above the level of the rear axles on the tractor. Likewise the passenger car on the lower track of the tractor was inclined upwardly and rearwardly at an angle of approximately 10° to the horizontal. The tractor-trailer shown in said patent was capable of negotiating a turn of about 57°; that is, a turn wherein the centerline of the tractor was disposed at an angle of about 57° to the centerline of the trailer.

The tractor-trailer combination of the present invention when fully loaded also meets the length and height restrictions of 60 feet and 13½ feet, respectively. However, the trailer of the present invention has a length of 40 feet and can negotiate an 80° turn. While the vehicle on the lower track of the tractor is inclined more steeply (12° to 15° as compared with 10°) than in the previously patented arrangement and overhangs the lower vehicle at the front end of the trailer to a greater extent, the lengthening of the trailer and the lowering of the fifth wheel assembly results in an arrangement where there is greater clearance between the forwardly facing end of the lower vehicle on the trailer and the rear end of the tractor which accounts for the greater angle of turn that can be negotiated by the tractor-trailer combination of the present invention.

With the foregoing features in mind the primary object of this invention resides in the provision of a motorcar carrier designed to transport seven full-size passenger cars, a mixed load of seven trucks and passenger cars or a lesser number of trucks within the length restriction of 60 feet and height restriction of 13½ feet.

Another object of the present invention is to provide a vehicle transport of the type described designed to negotiate relatively sharp turns.

A further object of the invention resides in the provision of a novel vehicle supporting track structure on a motorcar carrier for enabling loading of cars thereon in a closely nested position.

Other objects and advantages of the present invention will become apparent from the following description and drawings in which:

FIG. 3 is a fragmentary sectional view similar to FIG. 2 and showing the lower track on the tractor in the vehicle transport position.

FIG. 4 is a sectional view along the line 4—4 in FIG. 2.

FIG. 5 is a fragmentary plan view in the direction of arrow 5 in FIG. 2.

FIG. 6 is a fragmentary sectional view of the trailer illustrating the movable track structure for loading the lower central car on the trailer.

FIG. 7 illustrates a portion of the structure shown in FIG. 6 with the movable track in the lowered vehicle transporting position.

FIG. 8 is a fragmentary sectional view of the front portion of the trailer and illustrating specifically the lower track thereon.

FIG. 9 is a sectional view along the line 9—9 in FIG. 7.

FIG. 9a is a fragmentary perspective view of a portion of the structure shown in FIG. 9.

FIG. 10 is a sectional view along the line 10—10 in FIG. 8.

FIG. 11 is a fragmentary sectional view of a portion of the structure shown in FIG. 10 with the supporting crossbar in the extended position.

FIG. 12 is a fragmentary sectional view of the rear portion of the trailer showing the movable lower track section thereon.

FIG. 13 is a view similar to FIG. 1 and illustrating a load of six pickup trucks and one large heavy truck.

FIG. 14 is a fragmentary sectional view of the lower front portion of the trailer with the track thereon positioned for transporting a pickup truck.

FIG. 15 is a fragmentary sectional view of the pivotally supported jumper track section at the upper central portion of the trailer.

Figure 1:
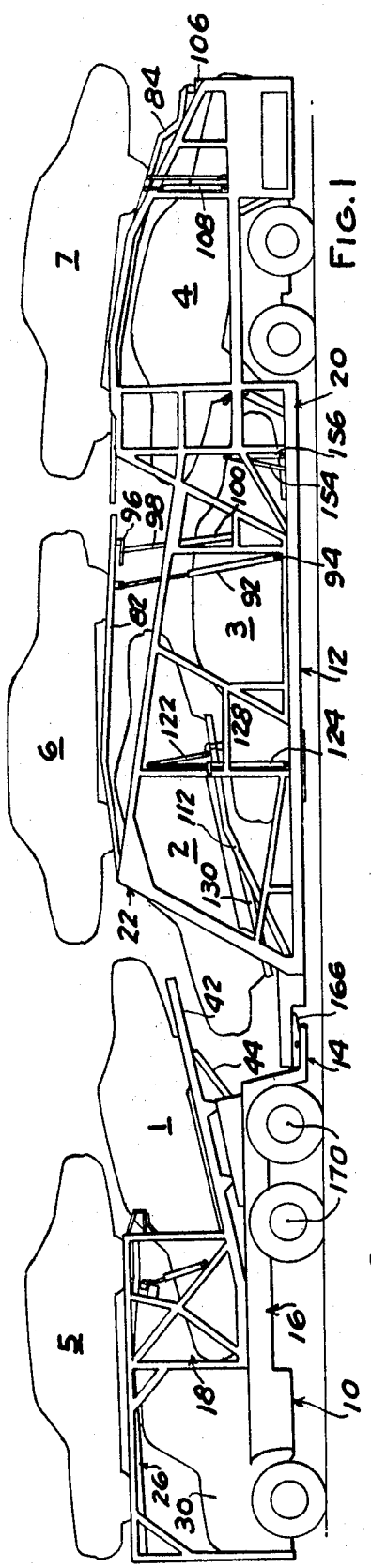
FIG. 1 is a side elevational view of a motorcar carrier according to the present invention and loaded with seven passenger cars.

Referring first to FIG. 1, the motorcar carrier of the present invention comprises a tractor 10 and a trailer 12 interconnected by a coupler 14. Tractor 10 has a main frame 16 on which the superstructure 18 for supporting vehicles is mounted. Trailer 12 also has a main frame 20 of the drop-center or low-bed type on which the superstructure 22 is mounted. In FIG. 1 a load of seven full-size passenger cars is illustrated in the loaded condition on the motorcar carrier. The seven cars are arranged primarily as a lower row and an upper row, the cars on the lower row being identified for purposes of this description as cars 1, 2, 3 and 4 and the cars on the upper row being identified as cars 5, 6 and 7. All of the cars illustrated in FIG. 1 are of the full-size passenger type having a length of about 215 to 220 inches, a maximum height of about 56 to 58 inches, a hood height of about 39 inches and a rear deck height of about 37 inches. When the term "passenger car" is used in this description and the appended claims it refers to a car having approximately these dimensions. The cars illustrated in FIG. 1 are all of the same type; namely, conventional two-door or four-door passenger cars. However, with the motor car carrier of this invention cars 1, 5, 6 and 7 could also be stationwagons which normally have a height slightly greater than an average passenger car and which, of course, have a roof which extends substantially to the rear of the vehicle.

Figure 2:
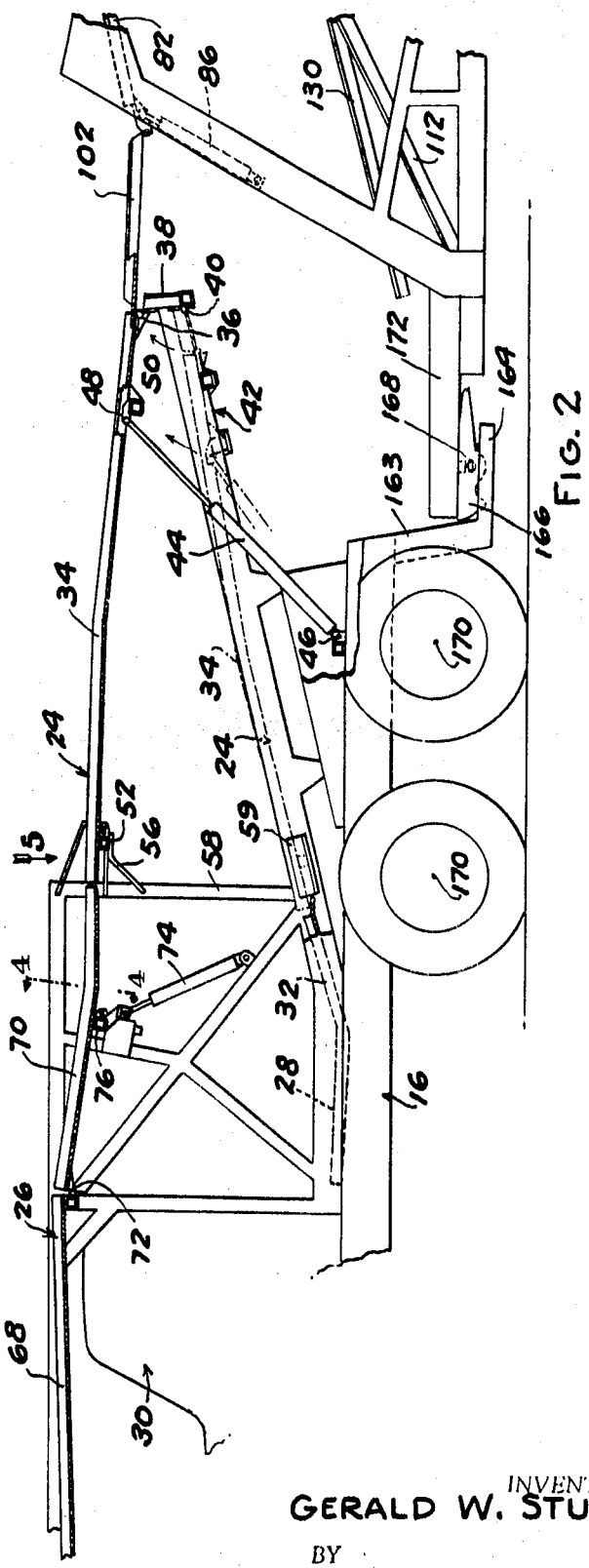
FIG. 2 is a fragmentary sectional view of the rear end of the tractor and the front end of the trailer showing the track sections thereon arranged for loading a vehicle on the upper track of the tractor.

Referring also now to FIG. 2, the superstructure 18 on the tractor 10 includes a lower track 24 and an upper track 26. Lower track 24 comprises a stationary section 28 at its forward end supported directly on the tractor frame 16 behind the cab 30 of the tractor. At its rear end stationary track 28 has a slight incline 32 which aligns with a second movable track section 34. Track section 34 has a hinged connection 36 at its rear end with a relatively short track section 38 pivotally connected as at 40 with the rear upper end of a rearwardly and upwardly inclined frame section 42 on the main frame 16 of the tractor. A piston-cylinder assembly 44 is mounted on the tractor frame as at 46 and is connected with track section 34 as at 48. When the piston-cylinder assembly 44 is in the retracted or collapsed position track sections 34 and 38 assume the positions indicated in FIG. 3 where they extend downwardly and forwardly so as to form a more or less continuous track with track section 28,32. As shown in FIG. 1, when a vehicle is supported on the lower track section of the tractor in the position indicated in FIG. 3, vehicle 1 is inclined downwardly in a forwardly direction at an angle of about 12° to 15° to the horizontal.

When piston-cylinder assembly 44 is extended to the position shown in FIG. 2 track section 38 pivots upwardly in a clockwise direction to a generally vertical position and track section 34 pivots upwardly to the somewhat horizontal position illustrated in FIG. 2. It will be appreciated that, while reference is made to a particular track section, actually there are two track sections in each instance, one at each side of the trailer which are interconnected by crossbars in some fashion. In the case of track sections 34 the interconnecting crossbars are illustrated at 50 and 52. These crossbars are preferably in the form of tubular members; and, in the case of crossbar 52, there is telescopically arranged within each end of the crossbar an extension support bar 54 (FIG. 5) which when track section 34 is in the elevated condition illustrated in FIG. 2 is adapted to be extended and bear vertically downwardly on a support bracket 56 mounted on a vertical frame member 58 (FIGS. 2 and 5). In the lowered position of track section 34 extension bars 54 are arranged to be supported on brackets 59 (FIG. 3). Extension bars 54 are interconnected by links 60 with opposite ends of a lever 62 pivotally supported at its center 64 on a bracket 66 on crossmember 52. A handle (not illustrated) is provided for pivoting lever 62 and thereby simultaneously actuating both support rods 54 at the opposite ends of crossmember 52.

Upper track 26 on the tractor (FIG. 2) comprises a front, stationary, generally horizontally extending section 68 and a rear section 70 which is pivotally supported as at 72 and adapted to be raised and lowered by a piston-cylinder assembly 74. In the position shown in FIG. 2 track section 70 is in a lowered position aligned with the forward end of track section 34 for loading a vehicle on the upper track section 26 of the tractor.

In a manner similar to the track sections 34 the two track sections 70 are interconnected by a crossbar 76 (FIG. 4) which is provided with telescoping support bars 78 at its opposite ends which, when the track section 70 is in the lowered position, are adapted to rest upon support brackets 80. Suitable brackets (not shown) are also provided for supporting track section 70 in a raised position. The actuating mechanism for retracting and extending the telescoping support bars 78 is the same as described above with respect to crossmember 52.

Referring now to FIGS. 1, 2, 3 and 6, trailer 12 has on its superstructure 22 a forward upper track 82 and a rear upper track 84 for supporting vehicles designated 6 and 7. Track 82 (there being one at each side of the trailer) is pivotally supported at its forward end as at 85 by a piston-cylinder assembly 86. The forward end of track 82 is guided for movement in an upwardly and rearwardly inclined guideway 88. At its rear end track 82 is pivotally connected as at 90 to the upper end of a piston-cylinder assembly 92, the latter being pivotally supported at its lower end on the trailer as at 94. When track 82 is in the elevated position shown in FIGS. 1 and 6 the rear end thereof is adapted to be supported by a pad 96 at the upper end of a rod 98 which is adapted to telescope within a tubular member 100 on superstructure 22. Means (not illustrated) are provided for locking telescoping rod 98 within tubular member 100 at any desired position of vertical extension.

In FIG. 2 piston-cylinder assembly 86 is shown in the contracted position so that the front portion of track 82 inclines downwardly and is interconnected with the rear portion of track 34 by a removable jumper track 102. In FIG. 3 track 82 is illustrated in the fully raised vehicle supporting position which it assumes when it supports a passenger car such as shown at 6 in FIG. 1 for transport.

The rear upper track 84 on the trailer is pivotally supported as at 104 (FIG. 6) and in the lowered position thereof its rear end is supported on pads 106 at the rear end of the trailer. A piston-cylinder assembly 108 is pivotally connected to track 84 as at 110 for enabling the track to be pivoted upwardly about the axis of pivot support 104 for enabling loading vehicles on the lower deck of the trailer. A telescoping rod and tube support 109 (similar to rod and tube 98, 100) is provided for supporting track 84 in the elevated position shown in FIG. 6.

The track structure on the lower deck of the trailer includes a front track 112, an intermediate track 114 and a rear track 116. Referring to FIG. 14, front track 112 is pivotally supported on the bed or frame 20 of the trailer as at 118 (FIG. 8) adjacent its front end. The rear end portion of track 112 is connected as by a crossbar 119 with the lower end of a link 122 as at 120. The upper end of link 122 is pivotally connected as at 123 to the upper end of a piston-cylinder assembly 124. At its lower end piston-cylinder assembly 124 is pivotally supported on the bed of the trailer as at 126. In the fully lowered position the rear end of track 112 is supported on the bed of the trailer as shown in FIG. 14, and in the fully elevated position of track 112 (FIG. 1) the rear end portion thereof is supported on a supporting bracket 128 as by extension rods 129 (FIGS. 9 and 11) in the same manner as described above with reference to tracks 34 and 70. A nesting track section 130 (FIG. 8) located within the forward end portion of track 112 is pivotally connected thereto as at 132. A leg 134 is pivotally supported on the underside of each nesting track section 130 adjacent the front end thereof for supporting the nesting sections 130 in a slightly elevated position as shown in FIGS. 1, 2 and 8.

The rear lower track 116 inclines upwardly and forwardly from the rear end of the trailer as shown in FIG. 12 over housing 136 for the tandem axle assembly 138. Housings 136 at each side of the trailer naturally form a hump on the trailer bed over which vehicles must be driven to load the vehicles on the lower tracks of the trailer. Track 116 includes a hinged section 140 which is pivotally supported as at 142 and adapted to be swung upwardly and forwardly from its collapsed nested position, designated 140a in FIG. 6, to the upwardly and forwardly inclined position illustrated in FIG. 12. A leg 144, pivotally supported on the trailer as at 145, is adapted to swing to an upright position and engage the underside of each hinged track section 140 to retain it in an upwardly and forwardly inclined position illustrated in FIG. 12. This upwardly inclined position of track section 140 is utilized for supporting the forwardmost wheels of vehicle 4 when the trailer is loaded as illustrated in FIG. 1.

The intermediate track 114 (FIG. 6) comprises a movable section 146 and a stationary track section 148 which is formed as a shallow well in the trailer bed below the rear end portion of the front lower track 112. Track section 146 has its forward end 150 slideably supported on the trailer bed for movement in a fore and aft direction. The rear end portions of the two track sections 146 are interconnected by a crossbar 151, the opposite ends of which are pivotally supported as at 152 by links 154. The upper ends of links 154 are pivotally connected with piston-cylinder assemblies 156 (FIGS. 1 and 6) pivotally supported on the trailer as at 157. A pair of upwardly and rearwardly inclined channels 158 are located at each side of the trailer adjacent the rear ends of track section 146. A round tubular crossbar 160 interconnects the two track sections 146 and extensible support bars 161 at each end thereof are adapted to be guided for movement in an inclined path by channels 158. Telescoping support bars 161 are adapted to engage in openings 162 at the upper ends of channels 158 to support the rear ends of track sections 146 in the elevated position shown in FIG. 6. In the elevated position of track sections 146 it will be observed that the rear ends thereof are substantially flush with the forward ends of track 116 over the wheel housings 136 of the trailer. When the piston-cylinder assemblies 156 are actuated to collapse or retract, the rear ends of track sections 146 shift downwardly and forwardly along the inclination defined by the channel guides 158 and the forward ends 150 of track sections 146 slide forwardly to a position adjacent the rear ends of the stationary tracks 148. In FIG. 6 track section 146 is shown in the elevated position and in FIG. 7 track section 146 is shown in the lowered position.

Referring now to FIG. 2, the rear end of the tractor has a depending support structure which includes a generally vertically extending frame 163 and a generally horizontally extending platform 164 which extends rearwardly from the lower end of frame 163. Coupler 14 comprises a fifth wheel assembly 166 pivotally supported on platform 164 with its horizontal pivot axis 168 located at a level substantially below the centerline of the rear wheel axles 170 on the tractor. As is the case with conventional fifth wheel assemblies, the vertical pivot axis of the fifth wheel 166 passes through the horizontal pivot axis 168. The forward end of the trailer has a low extension frame 172 adapted to be coupled to the fifth wheel 166 for interconnecting the tractor and trailer.

In order to assemble the vehicle load shown in FIG. 1 the upper track section 70 on the tractor is lowered and lower track section 34 is pivoted upwardly to the position shown in FIG. 2. At the same time the upper front track 82 on the trailer is lowered at its front end and interconnected with the rear end of track section 34 by jumper track 102. Vehicle 5 can then be driven over upper tracks 82,84 on the trailer to a position over the cab. Piston-cylinder assembly 74 is then actuated to pivot track section 70 upwardly and thereby elevate the rearwardly facing end portion of vehicle 5. Track section 34 is then lowered by collapsing piston-cylinder assembly 44 and vehicle 1 can then be driven into the position shown in FIG. 1 over track sections 82,84.

After vehicles 1 and 5 are loaded on the tractor vehicle 6 can be loaded to the position shown in FIG. 1, the front end of track section 82 having been elevated to the position shown in FIG. 3. Thereafter, with the intermediate track section 114 and the front track 112 in the positions indicated in FIG. 8, vehicle 2 can be driven over the lower track sections so that the front wheels thereof are located adjacent the forward ends of the nesting tracks 130. It will be observed that the front ends of track sections 146 are shown in a slightly elevated position in FIG. 8. These track sections are capable of being supported in this slightly elevated position by reason of the fact that at their front ends track sections 146 are interconnected by a crossmember 174 (FIG. 9) having telescoping support bars 176 at its opposite ends which, when projected outwardly, are adapted to rest upon pads 178. After vehicle 2 is driven onto tracks 112 piston-cylinder assemblies 124 are actuated to elevate vehicle 2 to the position shown in FIG. 1 where it inclines downwardly in a forwardly direction. It will be noted that in the transport position the front end of vehicle 2 is located rearwardly of the vertical pivot axis of fifth wheel assembly 166.

In loading vehicle 3 the forward end of the movable track section 146 is lowered from the position shown in FIG. 8 to that shown in FIG. 6 where it is slideably supported on a horizontal guide track 180 at each side of the trailer bed. This is accomplished by retracting the telescoping support rods 176 at the opposite ends of crossbar 174 and slightly retracting piston-cylinder assemblies 156. In the elevated position of track sections 146 the extensible bars 161 at the rear ends thereof are engaged in the openings 162 at the upper ends of the inclined guide channels 158 and thus, when piston-cylinder assemblies 156 are retracted slightly, track sections 146 pivot downwardly at their forward ends while their rear ends are pivotally supported at the upper ends of guide channels 158.

Vehicle 3 is then driven forwardly onto track 114 to the position shown in solid lines in FIG. 6 where there is only slight clearance, generally designated A, between the front roof portion of vehicle 3 and the lower rear portion of vehicle 2. Thereafter the telescoping bars 161 at opposite ends of crossbar 174 are retracted from openings 162 and cylinders 156 are retracted so that the rear end portions of track sections 146 shift downwardly in a forwardly inclined direction as controlled by guide channels 158 and the forward ends 150 of track sections 146 slide forwardly in guides 180 on the bed of the trailer. The front wheels of the vehicle roll forwardly in wells 148 and vehicle 3 is thus located in the position shown in broken lines in FIG. 6 where it is tucked in below vehicle 2 to a substantially greater extent than would be the case if the rear end of track 146 were merely shifted in a straight vertical downward path. Thus the inclination of guide channels 158 automatically shifts vehicle 3 in a forwardly direction when track section 146 is powered to enable the rear end of vehicle 3 to clear the forward end of wheel housings 136.

After vehicle 3 is located in the position shown in broken lines in FIG. 6 track section 140 of rear track 116 is pivoted forwardly to the inclined position shown in FIG. 12 and vehicle 4 is backed onto track 116 to the position shown in FIG. 1. It will be appreciated that while vehicles 2, 3 and 4 are being loaded the rear upper track 84 is shifted to the raised position illustrated in FIG. 6. After the lower deck of the trailer is loaded, track 84 is lowered to the position shown in FIG. 1 and vehicle 7 is driven forwardly thereon by means of a ramp (not illustrated).

FIG. 13 shows the same tractor-trailer combination illustrated in FIG. 1 with the tracks thereon arranged for transporting five pickup trucks and one large truck. The pickup trucks are designated as vehicles 1, 2, 3, 4 and 5; and the large truck is designated as vehicle 6. Vehicle 5 could also be a large truck. With the load arranged as illustrated in FIG. 13 the rear upper track section 70 on the tractor is elevated slightly from the position shown in FIG. 1 to provide clearance between the lower rear end of vehicle 4 and the upper rear corner of the cab on vehicle 1. This is necessitated by the fact that a pickup truck has vertical dimensions greater than the passenger cars shown in FIG. 1. For example, while a conventional pickup truck may have a length about the same as a full-size passenger car, it has a hood height of about 47 inches, a cab height of about 70 inches and a box height of about 50 inches.

When the trailer is being loaded with trucks as shown in FIG. 13, track 112 is pivoted downwardly at its rear end and the nesting track section 130 is also pivoted downwardly so that vehicle 2 is generally horizontally disposed. It will be observed that the front end portion of vehicle 2 is located slightly rearwardly of the vertical pivot axis of fifth wheel assembly 166. When vehicle 3 is a pickup truck it has its rear wheels supported on track section 146 (in the lowered position) and its front wheels supported on the portion of track 116 over the wheel housings 136. The upper front track 82 on the trailer has its forward end in the elevated position and its rear end lowered to the position shown in FIG. 13 so that the rear end portion of vehicle 6 can overhang the hood of vehicle 5.

In the arrangement shown in FIG. 13 the rear upper track 84 has a section 182 hinged to its forward end as at 184. Levers 186 are pivotally supported at each side of the trailer frame at 188 and are interconnected at their upper ends by a crossbar 190 extending transversely through a guideway 192 on the underside of each track section 182. A piston-cylinder assembly 194 is fixed on the trailer frame at one end as at 196 and is pivotally connected to lever 186 as at 198. As is shown in FIG. 15, when piston-cylinder assembly 194 is extended track sections 182 are pivoted from the downwardly hinged, broken line position upwardly to the generally horizontally extending position shown in solid lines and serve as jumper tracks between track 84 and track 82. After vehicle 5 is loaded and before track 82 is pivoted downwardly at its rear end, piston-cylinder assembly 194 is retracted to swing track section 182 to the downwardly folded position shown in solid lines in FIG. 13 so as to avoid interference with the front end of vehicle 5. With this arrangement the rear wheels of vehicle 6 are located directly adjacent the forward ends of track 84.

From the foregoing description it is clear that the tractor-trailer arrangement of this invention is admirably suited for carrying seven full-size passenger cars, a mixed load of seven passenger cars and trucks, or a load of at least six trucks. The adaptability of this unit to carry such loads is attributable primarily to the location of the fifth wheel assembly 166 and the inclination of track section 34 in the vehicle transporting position. As mentioned previously, fifth wheel assembly 166 has its horizontal pivot axis located at a level below the rear axles of the tractor and track section 34 in the vehicle transportation position is disposed so that the vehicle which it supports is inclined downwardly and forwardly at an angle of about 12° to 15° to the horizontal. In view of this relationship, although there is a very substantial amount of overlap between the rear end of vehicle 1 and the forward end of vehicle 2, the front end of vehicle 2 is spaced rearwardly of the tractor frame 16 a considerable distance and the unit is enabled to negotiate a turn of at least 80°. As a result of this arrangement, particularly the inclination of track section 34, the uppermost portion of vehicle 1 extends upwardly above the level of the rear axle of vehicle 5.

I claim:

1. A vehicle carrier adapted for transporting seven passenger cars, a mixed load of seven passenger cars and trucks, or a load of a lesser number of trucks within a length of 60 feet and a height of 13½ feet, the hereinafter-mentioned passenger cars having a length of 215 to 220 inches, a roof height of about 56 to 58 inches, a hood height of about 39 inches and a rear deck height of about 37 inches comprising, a highway tractor and trailer; the tractor having a main frame with a cab at the front end thereof; a generally horizontally extending upper vehicle supporting track on the tractor extending over said cab; a lower vehicle supporting track on the tractor which inclines upwardly and rearwardly such that when a passenger car is supported on the upper track the uppermost portion of a passenger car on the lower track extends rearwardly and to a level above the rearwardmost axle of the passenger car on the upper track; said lower track being pivotally supported adjacent its rear end for pivotal movement upwardly to a position wherein the forward end of said lower track is generally horizontally aligned with the rear end of the upper track on the tractor; the tractor frame having a depending support at the rear end thereof; a fifth wheel assembly on said depending support having its horizontal pivot axis spaced below the centerline of the rear axle of the tractor; said trailer having a frame provided with a front lower portion connected with said fifth wheel assembly; said trailer having a front lower vehicle supporting track shiftable between a generally horizontally extending lowered position and an upwardly and rearwardly inclined position; said last-mentioned track having a forward end which terminates such that, when a passenger car is supported thereon in either said lowered or inclined positions with the forwardmost wheels thereof at said forward end of the last-mentioned track, the forwardmost end of said last-mentioned passenger car is located rearwardly of the vertical pivot axis of the fifth wheel assembly; said trailer having a lower track for supporting a third vehicle at the rear end thereof in a downwardly and rearwardly inclined position; said trailer also having a lower generally horizontal track intermediate the front and rear lower tracks; said intermediate track being adapted to support a passenger car with the rearwardly facing end of a passenger car on the front lower track overhanging the forwardly facing end of the car on the intermediate track and the forwardly facing end of the passenger car on the lower rear track overhanging the rearwardly facing low end of the passenger car on the intermediate track; said trailer also having an upper track for supporting sixth and seventh vehicles.

2. A vehicle carrier adapted for transporting seven passenger cars, a mixed load of seven passenger cars and trucks, or a load of a lesser number of trucks within a length of 60 feet and a height of 13½ feet, the hereinafter-mentioned passenger cars having a length of 215 to 220 inches, a roof height of about 56 to 58 inches, a hood height of about 39 inches and a rear deck height of about 37 inches comprising, a highway tractor and trailer; the tractor having a main frame with a cab at the front end thereof; a generally horizontally extending upper vehicle supporting track on the tractor extending over said cab; a lower vehicle supporting track on the tractor which inclines upwardly and rearwardly such that when a passenger car is supported on the upper track the uppermost portion of a passenger car on the lower track extends rearwardly and to a level above the rearwardmost axle of the passenger car on the upper track; the tractor frame having a depending support at the rear end thereof; a fifth wheel assembly on said depending support having its horizontal pivot axis spaced below the centerline of the rear axle of the tractor; said trailer having a frame provided with a front lower portion connected with said fifth wheel assembly; said trailer having a front lower vehicle supporting track shiftable between a generally horizontally extending lowered position and an upwardly and rearwardly inclined position; said last-mentioned track having a forward end which terminates such that, when a passenger car is supported thereon in either said lowered or inclined positions with the forwardmost wheels thereof at said forward end of the last-mentioned track, the forwardmost end of said last-mentioned passenger car is located rearwardly of the vertical pivot axis of the fifth wheel assembly; said trailer having a lower track for supporting a third vehicle at the rear end thereof in a downwardly and rearwardly inclined position; said trailer also having a lower generally horizontal track intermediate the front and rear lower tracks; said intermediate track being adapted to support a passenger car with the rearwardly facing end of a passenger car on the front lower track overhanging the forwardly facing end of the car on the intermediate track and the forwardly facing end of the passenger car on the lower rear track overhanging the rearwardly facing low end of the passenger car on the intermediate track; said trailer also having an upper track for supporting sixth and seventh vehicles; the upper track on the trailer including a front section adapted to support a vehicle; said front track section being mounted on the trailer for independent vertical movement at the opposite ends thereof so that said front track section can be disposed in a generally horizontal position, in a position inclined downwardly and rearwardly, or in a position inclined downwardly and forwardly.

3. A vehicle carrier adapted for transporting seven passenger cars, a mixed load of seven passenger cars and trucks, or a load of a lesser number of trucks within a length of 60 feet and a height of 13½ feet, the hereinafter-mentioned passenger cars having a length of 215 to 220 inches, a roof height of about 56 to 58 inches, a hood height of about 39 inches and a rear deck height of about 37 inches comprising, a highway tractor and trailer; the tractor having a main frame with a cab at the front end thereof; a generally horizontally extending upper vehicle supporting track on the tractor extending over said cab; a lower vehicle supporting track on the tractor which inclines upwardly and rearwardly such that when a passenger car is supported on the upper track the uppermost portion of a passenger car on the lower track extends rearwardly and to a level above to rearwardmost axle of the passenger car on the upper track; the tractor frame having a depending support at the rear end thereof; a fifth wheel assembly on said depending support having its horizontal pivot axis spaced below the centerline of the rear axle of the tractor; said trailer having a frame provided with a front lower portion connected with said fifth wheel assembly; said trailer having a front lower vehicle supporting track shiftable between a generally horizontally extending lowered position and an upwardly and rearwardly inclined position; said last-mentioned track having a forward end which terminates such that, when a passenger car is supported thereon in either said lowered or inclined positions with the forwardmost wheels thereof at said forward end of the last-mentioned track, the forwardmost end of said last-mentioned passenger car is located rearwardly of the vertical pivot axis of the fifth wheel assembly; said trailer having a lower track for supporting a third vehicle at the rear end thereof in a downwardly and rearwardly inclined position; said trailer also having a lower generally horizontal track intermediate the front and rear lower tracks; said intermediate track being adapted to support a passenger car with the rearwardly facing end of a passenger car on the front lower track overhanging the forwardly facing end of the car on the intermediate track and the forwardly facing end of the passenger car on the lower rear track overhanging the rearwardly facing low end of the passenger car on the intermediate track; said trailer also having an upper track for supporting sixth and seventh vehicles; said trailer being provided with a tandem rear axle disposed adjacent but forwardly of the rear end of the trailer; said trailer having wheel housings extending over said tandem axle, said lower rear track extending over said wheel housings and having a hinged portion swingable from a position extending generally horizontally in a rearward direction to a position inclined upwardly and forwardly beyond the forward portions of said wheel housings.

4. A vehicle carrier including a trailer having upper and lower vehicle supporting tracks; said trailer being provided with a tandem rear axle disposed adjacent but forwardly of the rear end of the trailer; said trailer having wheel housings extending over said tandem axle; said lower track extending over said wheel housings and having a hinged portion swingable from a position extending generally horizontally in a rearward direction to a position inclined upwardly and forwardly beyond the forward portions of said wheel housings.

5. A vehicle carrier adapted for transporting seven passenger cars, a mixed load of seven passenger cars and trucks, or a load of a lesser number of trucks within a length of 60 feet and a height of 13½ feet, the hereinafter-mentioned passenger cars having a length of about 215 to 220 inches, a roof height of about 56 to 58 inches, a hood height of about 39 inches and a rear deck height of about 37 inches; said vehicle carrier comprising, a highway tractor and trailer; the tractor having a main frame with a cab at the front end thereof and a depending support at the rear end thereof; a fifth wheel assembly on said depending support having its horizontal pivot axis spaced below the centerline of the rear axle of the trailer; an upper track on the tractor for supporting a passenger car in a generally horizontal position over the tractor cab; a lower track on the tractor inclined upwardly and rearwardly and extending beyond said horizontal pivot axis of the fifth wheel assembly so that a passenger car can be supported thereon with its rearwardly facing end extending substantially beyond said fifth wheel assembly and with its uppermost roof portion extending to a level above the rearwardmost axle of a passenger car on the upper track, said trailer having a frame provided with a front lower portion connected with said fifth wheel assembly; said trailer having a front lower vehicle supporting track shiftable between a generally lowered position and an upwardly and rearwardly inclined position; said last-mentioned track having a forward end which terminates such that, when a passenger car is supported thereon in either said lowered or inclined positions with the forwardmost wheels thereof at said forward end of the last-mentioned track, the forwardmost end of said last-mentioned passenger car is located rearwardly of the vertical pivot axis of the fifth wheel assembly; said trailer having a lower track for supporting a third vehicle at the rear end thereof in a downwardly and rearwardly inclined position; said trailer also having a lower track intermediate the front and rear lower tracks; said intermediate track being adapted to support a passenger car in a generally horizontal position with the rearwardly facing end of a passenger car on the front lower track overhanging the forwardly facing end of the car on the intermediate track and the forwardly facing end of the passenger car on the lower rear track overhanging the rearwardly facing low end of the passenger car on the intermediate track; said trailer also having an upper track for supporting sixth and seventh vehicles.

6. A vehicle carrier as called for in claim 5 wherein the lower track on said tractor is disposed such that a vehicle thereon is inclined upwardly and rearwardly at an angle of about 12° to 15° to the horizontal.

7. A vehicle carrier comprising a tractor and trailer; said tractor having an upper vehicle supporting track extending forwardly over the tractor cab and a lower track for supporting a vehicle in a position inclined downwardly and forwardly of the tractor; said lower track extending rearwardly substantially beyond the rear end of said upper track; said trailer having upper and lower vehicle supporting tracks, the lower track on the tractor having a rear section supported on the tractor adjacent the rear end of said lower track section for pivotal movement from said downwardly and forwardly inclined position to a position wherein the forward end of said lower track is aligned with the rear end of the upper track on the tractor.

8. The combination called for in claim 7 including track means for interconnecting the rear end portion of the lower track on the tractor with the front end portion of the upper track on the trailer to permit loading of the upper track on the tractor by driving a vehicle over the upper track on the trailer.

9. The combination called for in claim 8 including means for shifting the front end portion of the upper track on the trailer vertically to align said forward end portion of the track on the trailer generally horizontally with the rear end portion of the lower track on the tractor.

10. A vehicle carrier having a generally flat bed with track structure thereon for supporting vehicles; means forming a hump in said bed adjacent the rear portion thereof and over which the wheels of a vehicle must pass for loading on the carrier; said track structure including means forming a first vehicle track extending forwardly over said hump with the front end thereof terminating at a level substantially above the bed of the carrier; a second track spaced forwardly of the first track for supporting a vehicle in a position inclined downwardly and forwardly of the carrier; a third track extending below and rearwardly of the second track and terminating at its rear end adjacent said hump; means supporting the front end portion of the third track for fore and aft movement in a generally horizontal plane; means connected with the third track for shifting the rear end portion thereof along a path which inclines downwardly and forwardly so that in one position of the third track it is generally horizontally disposed at a level below said hump and in another position of the third track it inclines downwardly and forwardly from said hump; means for supporting said third track in said two positions whereby, when a vehicle is supported on the third track with the third track in said inclined position and the rear portion thereof is shifted downwardly along said path, the vehicle on said third track is simultaneously shifted forwardly and pivoted downwardly to a generally horizontal position with the forward portion thereof nested beneath the rear portion of a vehicle on the second track.

11. A vehicle carrier as called for in claim 10 wherein said hump forming means comprises rear wheel housings at opposite sides of the carrier.

12. A vehicle carrier as called for in claim 10 wherein said third track has a length less than the length of a full-size passenger vehicle such that when a full-size passenger vehicle is supported on the third track with the rear end thereof just forwardly of said hump the forwardmost wheels of the last-mentioned vehicle are located forwardly beyond the forward end of the third track.

13. A vehicle carrier as called for in claim 10 wherein said means for shifting the third track between said inclined position and said lowered position includes a hydraulic piston-cylinder assembly.

14. A vehicle carrier as called for in claim 13 including means for limiting the extent to which the rear end portion of said third track can be moved vertically upwardly; said piston-cylinder assembly being connected with said third track to pivot the forward end of said third track upwardly when the rear end of the third track has reached the upper limit of its vertical movement.

15. A vehicle carrier as called for in claim 10 wherein said means for shifting said third track includes means forming a guideway on the carrier extending downwardly and forwardly and means interconnecting said track and guideway.

16. A vehicle carrier as called for in claim 15 wherein said guideway forming means comprise a pair of short guide tracks, one at each side of the trailer and extending rearwardly and upwardly from the bed of the trailer to adjacent the upper portion of said hump.

17. A vehicle carrier as called for in claim 16 wherein said interconnecting means comprises a pair of followers projecting outwardly from opposite sides of the third track and interengaging said short guide tracks.

18. A vehicle carrier as called for in claim 16 wherein the front end of the third track is slideably supported on the bed of the trailer.